Patented Jan. 25, 1938

2,106,521

UNITED STATES PATENT OFFICE 2,106,521

CONTINUOUS METHOD OF REACTING LIQUID REAGENTS

Richard M. Deanesly, Berkeley, Calif., assignor to Shell Development Company, San Francisco, Calif., a corporation of Delaware No Drawing. Application September 9, 1935, Serial No. 39,809

18 Claims. (Cl. 260—99.12)

This invention deals with a novel procedure for conducting chemical reactions between liquid reactants, particularly liquid reactants, each of which has a low physical solubility in the other, in a continuous manner whereby greater efficiency in the consumption of reagents and economies of operation may be effected.

The process of my invention essentially comprises continuously adding the liquid reactants to a reaction mixture of a composition with respect to elements in the feed which differs from the composition of the total feed with respect to those elements. To this end I find it advantageous to continuously return to the reaction zone a substantial part of one constituent of the reaction, whether a reactant or a reaction product thereof, preferably after separation therefrom of any diluent materials which may be present therein, while withdrawing a reaction product from the system substantially at the rate at which it is formed. By this procedure I have found it possible to adjust the conditions of reaction to the properties, both chemical and physical, of the reactants so that each of the components may be provided with a time of residence in the reaction zone best suited to its properties independently of the other component or components.

My process is thus radically different from prior procedures for reacting together reagents one of which has a low physical solubility in the other, since such prior methods have been largely restricted to batch operations with their obvious attendant disadvantages prominent among which are usually an undesirably long induction period which materially reduces the average production rate of the apparatus and high labor costs, etc. Proposals have been made for carrying out such reactions continuously whereby some of the deficiencies of the batch methods may be overcome. The continuous methods proposed heretofore suffer from the disadvantage of not providing for prompt removal from the reaction mixture of components thereof which are undissolved in the phase in which reaction takes place. This leads to undesirable dilution of the reaction mixture and greatly reduced capacity of apparatus. My method on the other hand not only provides for the continuous removal of such components of the reaction mixture but also permits selective return to the reaction zone of the phase in which the reaction substantially takes place whereby efficient use may be made of all reactants and high reaction rates attained.

My invention may be practiced with any suitable reactants in the liquid state which form reaction mixtures made up of two liquid phases, regardless of the nature of the chemical reaction or reactions involved. As examples of the diverse reactions to which my invention may be applied, the nitration of toluene, the sulfonation of benzene, the hydrolysis of amyl chloride, the saponification of esters, particularly fats and fatty oils, and the esterification, etherification and hydration of olefines may be mentioned as typical. While my invention is thus broadly applicable wherever liquid reagents of low physical solubility with respect to each other are reacted to give reaction mixtures made up of two liquid phases, it has particular advantage in the treatment of hydrocarbons with aqueous reagents since the solubility relationships are especially adverse in such reactions. For this reason my invention will be described with more particular reference to reactions of this class, especially the typical case of the production of olefine derivatives by absorption of the corresponding olefine in acid acting media, but it will be understood that this is merely in the interest of conciseness and clarity and implies no limitation since by obvious modification my invention may be applied with equal advantage not only to the other types of reaction listed above but also to many other reactions between still different liquid reactants.

As applied to the manufacture of alcohols, ethers, esters and like derivatives which may be produced by absorption of the corresponding olefines in acid acting media, my invention may be practiced wtih any suitable olefine or olefinic mixture regardless of the source or character of its olefine content. As suitable starting material, hydrocarbons derived from mineral oils as petroleum, shale oil, and the like, or from mineral oil products, or from natural gas, or from coal, peat and like carboniferous natural material, may be used, as well as those derived from animal and vegetable oils, fats and waxes. The olefines present in such starting material may be of natural occurrence, the result of dehydrogenation, distillation, vapor or liquid phase cracking, or other pyrogenetic treatment. The olefines may be used in a pure state, either as individual olefines or pure olefinic mixtures, or in admixture with paraffins or other compounds which may be considered as inert in the process. Furthermore, such olefines may comprise hydrocarbon fractions consisting of, or predominating in, hydrocarbons containing the same number of carbon atoms to the molecule, or of mixtures of non-isomeric hydrocarbons. Ethylene and/or secondary base olefines (i. e. olefines, both iso and normal, which yield secondary derivatives, as propylene, 1-butene, 2-butene, 1-pentene, 2-pentene, 3-methyl-1-butene, and the like) and/or tertiary-base olefines (i. e. iso-olefines which yield tertiary derivatives, as 2-methyl propene, 2-methyl-2-butene, 2-methyl-1-butene, and higher homologues and analogues) may thus be used.

Suitable acid acting media which may be used in this application of my process include: inorganic acids, of which sulfuric, phosphoric, pyrophosphoric and hydrochloric are typical; or organic acids, as benzene sulfonic, naphthalene sulfonic, toluene sulfonic, and homologues and analogues thereof; or "acid liquors" such as are obtained by the absorption of olefines in mineral acid acting acids such as the above; or aqueous solutions or suspensions of acid-acting salts, such, for example, as sodium bisulfate, and the like.

The concentrations in which such acid acting media may be used in any particular case will depend upon the nature of the acid acting compound and olefine or olefines employed, the concentration of the olefine or olefines used and the temperature at which the absorption is carried out. When the acid acting agent is sulfuric acid, for example, I have found that concentrations within the range of about 40% to about 100% may be satisfactorily used. For the absorption of tertiary-base olefine concentrations of about 40% to about 80% are preferable, while for secondary-base olefine concentrations of about 80% to about 100% are more suitable. Irrespective of the temperature conditions or acid concentrations used I prefer to carry out the process with the olefine or olefines undergoing treatment in the liquid phase, that is, at pressures greater than the vapor pressure of the olefine at the operating temperatures. By operating with the olefine in the liquid phase, more accurate control of the proportions of acid phase to hydrocarbon in the reactor may be had in a very simple manner irrespective of the proportions of the feed or products.

In general reactions between liquid reagents of low physical solubility with respect to each other appear to take place predominantly in one of the phases only, thus I have found that the reaction of olefines with acid acting media takes place in the acid phase, so that, provided enough agitation is created to maintain the acid phase saturated with olefine, the output of a reactor, other things being equal, depends upon the volume of acid phase present. The volume of acid phase which may be present is only limited by the size of the mixing unit which in any given case will be determined by economic considerations of pump and separator size. The latter in particular, is preferably limited to such a size as will make excessive residence times whether in the separator or reactor, which might lead to decomposition, unnecessary. The minimum size reactor, on the other hand, is that which when maintained practically full at all times permits the transfer under agitation of as much olefine per unit time as will react with the acid phase.

If we consider the case of the reaction between two liquids or components of them of limited physical solubility, it is clear that the complete reaction requires two steps which may be considered separately, viz. I—the transfer by agitation of the reactant in one phase to a state of solution in other phase—the latter being the phase in which predominantly, if not wholly, reaction takes place, and II—the homogeneous chemical reaction in the latter phase. For most efficient utilization of the reaction zone, i. e. greatest overall reaction rate, it is desirable that there shall be present in the reaction zone the greatest possible amount of the latter phase, subject to the provision that there shall be as much of the former phase as is required to permit a rate of transfer of reactant by agitation from the former phase to solution in the latter equal to the rate of reaction of the transferred reactant in the latter (or reaction) phase. Now while the conditions conducive to the physical process of rapid phase transfer are those of degree of turbulence, interfacial tension and the like, the conditions conducive to the chemical process of homogeneous reaction are temperature and concentration of reactants and catalysts. It is the purpose of this invention to achieve an arrangement of operating conditions which satisfy these independent requirements and is not limited by the stoichiometric relationships of the reaction which govern the composition of the feed.

Whereas in the prior art in continuously reacting together liquid reagents in a mixing zone and continuously withdrawing reaction products in equivalent amount, proportions of the chemical elements present in the reaction zone were invariably those proportions present in the feed, with the novel arrangement here described the proportions in the reaction zone can be varied entirely independently of the proportions in the feed with resultant considerable advantages. Whereas formerly if it was desirable to carry out a reaction continuously in the presence of a large excess of one of the components of the reaction whether reactant or product, it was necessary to add that excess of component to the feed and remove it from the product in a separate operation process, with the present arrangement that desirable excess of one component in the reaction mixture can be achieved while introducing the reactants as feed in the stoichiometric proportions.

In the absorption of olefines in acid acting media, the rate of transfer of olefine from hydrocarbon phase to acid phase depends not only on the degree of agitation, altho this is highly important, but also upon the interfacial tension and diffusion and solubility characteristics of the olefine with respect to the acid phase, which vary markedly with the composition of the acid phase. The velocity of the homogeneous reaction in the acid phase is influenced to an even greater extent by the solubility of the olefine in the acid phase, the rate of reaction increasing as the concentration of adsorbed but unreacted olefine increases. Depending upon the olefine or olefines being treated, the composition of the acid layer recycled in accordance with my invention will vary. In the case of the tertiary base olefines where absorption in aqueous acid and hydration to the corresponding tertiary alcohol are, for all practical purposes, synonymous, the acid layer will have an alcohol content practically equivalent to the reacted olefine content, while for absorption products of propylene and similar olefines which form less easily hydrolizable addition products with the mineral acid acting acid present, the acidic layer will have a composition characterized by ratios of esters to free alcohol determined by the hydrolysis equilibrium of those esters under the reaction conditions. Due to the low free water content of the recycled acid, the decline in activity of the acid owing to dilution with reaction products is more than offset, up to a certain point, by the increased solubility of unreacted olefine in the acid phase. Thus the overall rate of reaction is not by any means lowered as a result of recycling acid layer, and so, in effect, reacting the olefine with nearly fully reacted acid. Further, the use of nearly fully reacted acid of low total acidity as the absorption medium permits the employment of temperatures very much higher than would be safe with fresh acid.

The actual conditions of operation adopted in any given case will depend upon the efficiency of conversion desired. It has been found for example, that isobutylene present in a concentration of 20% in 80% of inert diluents may be converted to tertiary butyl alcohol by my method at a rate of about 25 to 30 gallons of anhydrous alcohol per day per gallon of reaction space with a conversion of over 85% of the isobutylene in the feed. Much higher rates of thruput are possible when the conversion is allowed to fall.

The following examples which show applications of my invention to the selective absorption of tertiary and secondary base butylenes in aqueous sulfuric acid, illustrate the advantages of my novel process. It will be understood, however, that as has already been pointed out, many other applications and modifications are possible without departing from the spirit of my invention.

Example I

As starting material for the production of tertiary butyl alcohol in one typical instance, a butane-butylene fraction having the following approximate composition was used.

|  | Per cent by volume |
|---|---|
| Paraffin hydrocarbons | 30.8 |
| Butene 1 and butene 2 | 29.6 |
| Isobutylene | 39.6 |

This hydrocarbon mixture was fed, in the liquid state, at a rate of about 3.13 gallons per hour per gallon of reaction space to a continuous reactor comprising a mixer of about 800 cc. volume fitted with a high speed stirrer so as to act as an inefficient centrifugal pump and discharge from the circumference to a separator. At the same time a 63.2% solution of sulfuric acid was added at the rate of about one gallon to each 5 gallons of hydrocarbon feed. The temperature of the reactor was kept at approximately 49° C. and the rate of discharge therefrom was kept substantially constant at about 30 gallons per hour per gallon of reaction space. The reactor and separator were maintained under sufficient pressure (e. g. about 100 to 150 lbs./sq. in.) to ensure both being kept full at all times and the unabsorbed hydrocarbons were withdrawn as fast as separated while a part of the absorption product was recycled to give a ratio of about .11 volumes of acid phase to one volume of hydrocarbon phase in the reactor and an average time of contact of the two phases of about two minutes. The following results were obtained:

| | |
|---|---|
| Unreacted isobutylene content of the discharged hydrocarbon layer per cent by volume | 10.5 |
| Absorbed isobutylene in the absorption product as % of the isobutylene fed to the reactor per cent | 72.7 |
| Mols of isobutylene absorbed per mol. of sulfuric acid used mols | 1.64 |
| Gallons of tertiary butyl alcohol produced per 24 hours per gallon of reaction space gallons | 38.2 |

In larger scale operations it has been found more advantageous to replace the above described mixer by an efficient centrifugal pump and a series of tubes having a volume equivalent to that of a mixer of the required increased capacity. In this system it is particularly desirable to provide a by-pass whereby the emulsified reactants may be recirculated and unnecessary load on the separator thereby avoided.

In Example I there was available a hydrocarbon mixture which it was desired, in order to comply with the stoichiometric requirements of the reaction, to react continuously with one-fifth of its volume of sulphuric acid of a certain strength. By the methods previously used the passing of this feed at a rate of five gallons of hydrocarbon per hour continuously through a mixing and reaction zone of 1 gallon volume would have resulted in there being present in the reaction zone at all times five-sixths of a gallon of hydrocarbon to one-sixth of a gallon of acid (ignoring volume changes due to reaction) so that both materials would have a residence time in the reaction zone of one-sixth of an hour. Now this residence time of one-sixth of an hour is more than sufficient for the physical process of phase transfer of the whole of the reagent from the hydrocarbon phase into the acid phase, but is less than sufficient to permit the chemical reaction of this quantity of reagent in the volume of acid phase present.

Accordingly by the methods of my invention I reduce the residence time of the hydrocarbon phase and increase that of the acid phase by withdrawing from the reaction zone at a rate of thirty gallons per hour to a separator and return from the separator to the reaction zone twenty-four gallons per hour of the acid phase. Thus altogether I have entering and leaving the reaction 5 gallons per hour of hydrocarbon and 25 gallons per hour of acid made up of one gallon of fresh acid and twenty-four gallons of recycled acid phase, i. e. acid which contains absorbed olefine, so that the reaction zone now contains one-sixth of a gallon of hydrocarbon and five-sixths of a gallon of acid phase. Thus the hydrocarbon now has a residence time of one-thirtieth of an hour, which suffices for the physical process of transfer from the hydrocarbon phase to the acid phase of all the reactant hydrocarbon, while the acid phase is in emulsified contact with the hydrocarbon phase for five-sixths of an hour. The acid phase now has a five times greater volume in the reaction zone than in the former case and the amount of reaction which can therefore take place in it is increased proportionately. The extra degree of freedom in choice of operating conditions and consequent advantage thus obtained enabling the adjustment of conditions to the requirements of the process is thus clearly seen whether from the standpoint of adjusted residence time or adjusted reaction phase volume.

Example II

In order to compare the effect of recycling hydrocarbon layer instead of acid layer the following tests were made using the same apparatus. In each case the isobutylene content of the hydrocarbon feed was 40.2% and the strength of the sulfuric acid was 64%.

|  | Recycling acid layer | | Recycling hydrocarbon layer | |
| --- | --- | --- | --- | --- |
|  | Mols of isobutylene | Percent of isobutylene fed | Mols of isobutylene | Percent of isobutylene fed |
| Isobutylene input | 79.8 | 100.0 | 54.3 | 100.0 |
| Isobutylene in acid layer | 65.0 | 82.5 | 33.4 | 61.5 |
| Isobutylene in hydrocarbon layer as tertiary butyl alcohol | 2.4 | 3.0 | 2.2 | 3.9 |
| As free isobutylene | 7.75 | 9.5 | 12.8 | 23.3 |
| Isobutylene unaccounted for | 4.0 | 5.0 | 6.0 | 11.1 |
| Duration of experiment | 7.7 hours | | 6.0 hours | |
| Average tertiary butyl alcohol content of acid layer | 45.1% | | 25.2% | |
| Average production rate (gram mols of total alcohol per hour) | 8.8 | | 5.9 | |

These results show the advantages both in increased rate of production and efficiency of operation obtainable by having a large volume of recycled acid layer present during absorption. In the above case about 95 to 97% of the contents of the reactor was acid phase when acid layer was recycled and only about 10 to 15% when the acid passed thru only once.

Example III

For the preparation of an absorption product of secondary-base butylenes in sulfuric acid, a liquid hydrocarbon mixture obtained as a hydrocarbon layer from a butane-butylene fraction which had been treated according to the procedure described in Example I, was used. This had the following approximate composition:

|  | Percent |
| --- | --- |
| Isobutylene | 3 to 5 |
| 1-butene and 2-butene | 49 |
| Iso and normal butanes | 47 |

This hydrocarbon mixture was fed, together with 84.4% sulfuric acid in the proportion of 1.3 to 1.4 mols of acid per mol. secondary-base olefine, to the above described reactor. The hydrocarbon feed was at the rate of 6.5 gram mols of secondary-base butylenes per hour and the reactor contents were maintained at about 30° C. About 95% of the acid layer was recycled to the reactor as before. The average olefine content of the exit hydrocarbon layer was 6.6%. Only a very small amount of polymer about equivalent to the isobutylene content of the feed could be detected. The average composition of the separated acid layer was

|  | Percent by weight |
| --- | --- |
| Secondary butylenes (as alcohol) | 31.0 |
| Total acid (as $H_2SO_4$) | 59.6 |
| Free titratable acid (as $H_2SO_4$) | 49.0 |

This represents a 93.4% conversion of 1-butene and 2-butene at a rate equivalent to 16.9 gallons of anhydrous secondary butyl alcohol per day per gallon of reaction space.

Many variations in my process are obviously possible. For example, results practically identical to those described in the above examples may be obtained by substituting phosphoric acid solutions of the same concentrations for the sulfuric acid solutions described. Another modification which may sometimes be desirable, altho involving more equipment, comprises carrying out the absorption in more than one step. Thus two or more independent mixers operating successively on the same olefine containing material may be used, a major portion of the resulting absorption product being recycled to the same mixer in each case and the separated portions of the absorption products being combined for working up into the desired end product, or the minor part of the absorption product from one stage may be used in lieu of fresh acid in a preceding stage. The latter procedure is the equivalent of the use of an "acid liquor" as absorption medium for one stage of the operations and approaches in effect the use of an alkyl acid sulfate, for example, as the mineral acid acting acid agent. The use of alkyl acid esters of mineral acid acting acids as absorption agents is especially useful where both secondary and tertiary-base olefines, particularly isomeric secondary and tertiary-base olefines, are to be absorbed. In such cases the secondary-base olefine or olefines may be absorbed in a polybasic mineral acid acting acid of appropriate strength and that part of the resulting absorption product which is separated from the recycled portion may be used, advantageously after dilution, to absorb the desired tertiary-base olefine using my novel recycling step as before. In this way substantial acid economies may be effected since the total olefine content of the final absorption product may be much higher than is commercially feasible in prior art procedures. Whatever modification of my process is used, it is desirable to separate unabsorbed hydrocarbons from the recycled acid liquor as needless dilution of the reaction mixture is thereby avoided.

Altho the above examples have been described with more particular relation to the preparation of alcohols it will be apparent that the absorption products obtained by my novel process may be converted, by known methods, into a wide variety of other end products. Distillation of the absorption product under more acid conditions than those used for the recovery of alcohols favors the formation of ethers, while reaction with fatty acids, for example, acetic acid, may be used to produce the corresponding esters. Alternatively the alkyl acid sulfates present in the absorption products may be converted by treatment with alkaline agents such as sodium hydroxide and the like into salts which are valuable wetting agents and detergents. Or the absorbed olefines may be polymerized by rapid heating, preferably under pressure, to give higher boiling hydrocarbons of high anti-knock value. Alkyl substituted phenols may be produced by reacting the absorption products obtained in my process with an excess of phenol. My invention is also useful in the preparation of pure olefines from olefinic mixtures since by means of my novel absorption process the more reactive of such olefines may be selectively removed and the resulting absorption product used to regenerate, in a substantially pure form, the absorbed olefine by controlled heating.

The foregoing examples illustrate applications of my invention in which the presence of a reaction product in the recycled phase increases the solubility of the other reactant therein and consequently promotes the homogeneous reaction in the recycled phase in accordance with the Mass action law. The following example which is typical of applications of my invention where an excess of a reactant in the recycled phase accomplishes the same result, shows the wide applicability of my process wherever the reaction mixture forms two liquid phases.

Example IV

Alcohols may be reacted with olefines by my process to give particularly good yields of ethers at high rates. In one such application of my invention a continuous reactor similar to that described in Example I, was charged with a mixture of methyl alcohol and sulfuric acid in the proportion of 3 volumes of alcohol to 1 volume of acid. A mixture of pentanes and amylenes analyzing about 25% tertiary base olefines was then fed in together with methyl alcohol in the ratio of 1 volume of alcohol to 20 volumes of hydrocarbon. The reactor was maintained at about 50° C. and under 50 pounds pressure to prevent volatilization of hydrocarbons. The addition of reactants was at a rate of about 1 volume per minute per 47.4 volumes of reactor contents and the withdrawal of emulsified mixture was exactly equivalent. The withdrawn mixture was conducted to a separator where it was allowed to stratify. All the acid layer was continuously returned to the reactor while the upper hydrocarbon layer was removed. After equilibrium conditions had been reached the upper layer was found to contain on the average about 18% by weight of methyl-tertiary amyl ether which could be recovered by washing to remove traces of acid and amyl alcohol and then distilling.

This method of continuous etherification may not only be successfully applied to the higher homologues of methyl alcohol, such for example, as ethyl, propyl, isopropyl, normal, iso-, secondary and/or tertiary butyl alcohols and their suitable substitution products but also to polyhydric alcohols, such as ethylene, propylene, butylene and like glycols, polyglycols as diethylene glycol, dipropylene glycol, propylene-ethylene glycol, etc., glycerol, sorbitol, etc. In all cases other olefines besides the tertiary amylenes above illustrated may be used.

This reaction exemplifies, particularly well, the advantages of my process using a high proportion of acid phase to hydrocarbon phase. In this case, where the usual batch methods, in which the ratio of hydrocarbon to acid is reversed, are applied, about two hours are required to reach chemical equilibrium despite the best of mixing, while in my procedure less than two minutes are necessary under otherwise similar conditions.

Example V

For the preparation of benzene sulphonic acid it is required to react together benzene and 100% sulphuric acid in the proportions 78 gms. (89 cc. approx.) to 98 gms. (53 cc. approx.). The reactants in these proportions were fed into a reactor of 400 cc. volume continuously. Reaction mixture was withdrawn to a separator at rate of 10,000 cc./hr. or 25 volumes per volume of reactor per hour. 8000 cc. of the lower layer from the separator was returned continuously to the reactor and the remainder withdrawn as product. The level in the reactor was maintained by feed of reagents in the stoichiometric proportions above. The produce was found to consist of 9.6% mol. unreacted benzene which separated as upper layer and could be returned to the process, 89.4% mol. benzene sulphonic acid and 9.6% unreacted $H_2SO_4$ and the balance water equivalent to that formed by the reaction. The reaction mixture when under steady operating conditions showed one part of upper layer to 12 of lower layer, in contrast to the (approximately) 2 volumes of upper layer to 1 volume of lower layer in the feed.

It will be obvious that this continuous sulfonation procedure may be applied not only to a wide variety of other aromatic compounds including for example toluene, xylene, nitro benzene and other suitable benzene substitution products as well as naphthalenes, naphthols, anthraquinone and the like, but also olefines such as ethylene and its homologues and, by the use of oleum, paraffin hydrocarbons such for example as hexane, the octanes, etc.

From these typical examples it will be evident not only that my invention may be used in the production of a wide variety of valuable products but also that in all its many applications it offers important advantages over prior methods of operation. It furnishes a particularly desirable method for carrying out continuous reactions in which all components of the reaction mixture including the reaction product are advantageously maintained in the liquid phase in order to avoid undesirable side reactions or for other reasons. It will be evident that while my invention has been illustrated by examples in which the operations of mixing and reacting were carried out in different apparatus from that used for stratifying and separating the phases of the resulting reaction mixture, such operations may readily be carried out in the same unit by suitably providing reaction and separation zones therein. By my process the usual induction period accompanying reactions in which the velocity of solution of one reactant in the other is greater than the velocity of reaction between said reactants, is substantially avoided and the resulting average rate of reaction is thereby not only increased but also made more uniform. Furthermore my invention has unique advantages in carrying out reactions in the presence of inert diluent materials, particularly where such diluent material is immiscible with the reactant phase in which the reaction takes place, since by recycling that phase only from a separator as described in Examples I, II and III, not only is undesirable dilution of the incoming reactants avoided, but also a reaction mixture is provided which is richer in that phase than can be obtained by mixing the required amounts of the two reagents without such selective recycling.

While I have in the foregoing described in some detail the preferred embodiments of my invention and have particularly emphasized its applications to reactions of acid acting media with liquid hydrocarbons, it will be obvious to those skilled in the art that alkaline reagents, as in the hydrolysis of halogenated hydrocarbons with NaOH, $Na_2CO_3$, and the like solutions, for example, may also be used, and therefore my invention is to be regarded as limited only by the terms of the accompanying claims.

I claim as my invention:

1. A process for continuously reacting an organic liquid reagent reactive with another liquid reagent in which it has a low physical solubility which comprises continuously adding said reagents to a reaction mixture of a composition with respect to the elements in the feed which is different from the composition of the total feed, continuously removing reaction mixture from the reaction zone without substantially changing its composition, separating at least a part of the reaction product corresponding to that formed in the reaction and continuously returning sufficient of a remaining component of the reaction mixture to said reaction zone to maintain said composition difference between the total feed and the reaction mixture.

2. A process for continuously reacting an organic liquid reagent with a second liquid reagent in which its solution velocity is greater than the velocity of the reaction between said reagents under the existing conditions which comprises continuously contacting said liquids in a reaction zone containing a preponderance of the liquid phase in which the reaction substantially takes place, continuously withdrawing reaction mixture from said reaction zone without substantially changing its composition, separating reaction product therefrom equivalent to that formed in the reaction and continuously returning to said reaction zone at least a part of the withdrawn phase in which the reaction substantially takes place.

3. A process for continuously reacting an organic liquid reagent reactive with another liquid reagent in which its solution velocity is greater than its characteristic reaction velocity under the existing conditions which comprises continuously adding said reagents to a reactor maintained at a temperature at which reaction between the two reagents takes place, continuously withdrawing reaction mixture from said reactor at a rate substantially greater than the total rate of feed of said reagents without substantially changing the composition of said mixture, separating material immiscible with the phase in which the reaction takes place, removing at least a part of the reaction product equivalent to that formed in said reaction and continuously returning the remaining components of the withdrawn reaction mixture to the reactor.

4. A process for continuously reacting an organic liquid reagent with another liquid reagent in which it has a limited physical solubility which comprises continuously contacting said reagents in the presence of a reaction product thereof at a temperature and at a pressure at which reaction between said reagents takes place with the formation of a reacted mixture made up of two liquid phases, continuously stratifying and separating said phases and returning at least a part of one of said phases containing said reaction product to contact with fresh reagents in the reaction zone.

5. A process for continuously reacting an organic liquid reagent with another liquid reagent in which it has a limited physical solubility which comprises continuously adding said reagents to a reactor containing a substantial excess of one reagent above the stoichiometric proportion in which said reagents react while maintaining said reactor at a temperature and at a pressure at which reaction between said reagents takes place in the liquid state with the formation of a reacted mixture made up of two liquid phases, continuously withdrawing reacted mixture from said reactor, stratifying and separating said two liquid phases, removing one phase from the system, recovering reaction product substantially equivalent to that formed in the reaction and continuously returning the other of said phases containing said excess reagent to the reactor.

6. A process for continuously reacting at least one component of a mixture of organic compounds of different reactivity toward a liquid reagent in which said component has a limited physical solubility which comprises continuously contacting said mixture in the liquid state with said liquid reagent at a temperature and at a pressure at which reaction between the more reactive component and the liquid reagent takes place in the presence of substantially reacted liquid reagent without substantial conversion of at least one component of said organic mixture, continuously withdrawing reaction mixture from the reaction zone, separating the liquid phases present, removing the phase containing the unreacted organic compound and continuously returning such a part of the other phase as does not contain reaction product equivalent to that formed in the reaction to said reaction zone.

7. A process for continuously reacting an organic liquid reagent with a second liquid reagent with which it forms a reaction product of low physical solubility in said second reagent which comprises continuously adding said reagents to a reaction mixture containing an excess of said second reagent, continuously withdrawing reaction mixture from the reaction zone without substantially changing its composition, stratifying the withdrawn mixture into a phase containing reaction product and a phase containing said second liquid reagent, continuously removing the phase containing the reaction product from the system and continuously returning the phase containing said second liquid to contact with fresh reactants.

8. A process for continuously reacting an organic liquid reagent with a second liquid reagent in which it has a low physical solubility and with which it forms a reaction product which is soluble in said second liquid which comprises continuously contacting said reagents in the presence of an excess of a phase containing said second liquid reagent, continuously withdrawing reaction mixture therefrom without substantially changing its composition, separating material immiscible with said second liquid reagent, removing from the system a part of the phase containing said second reagent containing reaction product equivalent to that formed in the reaction and returning the remainder of said phase to contact with fresh reactants.

9. A process for continuously reacting an organic reagent with another reagent in which said organic reagent has a solution velocity greater than the velocity of the reaction between said reagents under the existing conditions which comprises continuously adding said reagents to a reaction zone maintained at a temperature at which reaction between said reagents takes place and under a pressure at least equal to the vapor pressure of the most volatile component of the reaction mixture, continuously withdrawing reaction mixture from said zone without substantially changing its composition at the rate at which solution of said organic reagent in the phase containing said other reagent is complete, continuously separating material present in said withdrawn mixture which is immiscible with said liquid phase, continuously withdrawing from the system reaction product at substantially the rate at which it is formed, and continuously returning such a part of said liquid phase that the average time of residence thereof in said reaction zone substantially corresponds to complete reaction.

10. A process for continuously producing a hydrocarbon derivative which comprises continuously feeding a hydrocarbon and a liquid reagent reactive therewith in which said hydrocarbon has a low physical solubility to a reactor maintained substantially liquid-full and at a temperature at which reaction between said hydrocarbon and said reagent takes place, continuously withdrawing reaction mixture therefrom without substantially changing its composition at a rate substantially greater than the rate of feed of hydrocarbon and reagent, separating material immiscible with the phase in which the reaction takes place, continuously removing reaction product substantially at the rate at which it is formed and continuously returning at least a part of said phase in which the reaction takes place to said reactor.

11. A continuous process for producing hydrocarbon derivatives which comprises continuously feeding a hydrocarbon and an aqueous reagent reactive therewith to a reactor containing preponderantly substantially reacted aqueous phase maintained at a temperature at which reaction between said hydrocarbon and said aqueous reagent takes place and at a pressure at which all components of the reaction mixture are in the liquid state, continuously withdrawing reaction mixture from said reactor without substantially changing the composition thereof, separating any hydrocarbon material which may be present undissolved in the aqueous phase, continuously removing reaction product substantially at the rate at which it is formed and continuously returning aqueous phase to said reactor.

12. A continuous process for producing a hydrocarbon derivative which comprises continuously feeding a hydrocarbon and a liquid acid-acting medium to a reaction zone containing an excess of said acid-acting medium maintained at a temperature at which reaction between said hydrocarbon and said aqueous reagent takes place and at a pressure at which all components of the reaction mixture are in the liquid state, continuously withdrawing reaction mixture from said reactor without substantially changing the composition thereof, separating any hydrocarbon material which may be present undissolved in the acid-acting medium, continuously removing reaction product substantially at the rate at which it is formed and continuously returning aqueous phase to said reaction zone.

13. A continuous process for producing a hydrocarbon-sulfuric acid reaction product which comprises continuously feeding a hydrocarbon and a sulfuric acid containing phase to a reaction zone containing a preponderance of substantially reacted sulfuric acid phase while maintaining in said zone a temperature at which reaction between said hydrocarbon and sulfuric acid takes place and at a pressure at which all components of the reaction mixture are in the liquid state, continuously withdrawing reaction mixture from the reaction zone, separating hydrocarbon undissolved in the sulfuric acid, continuously removing a part of the sulfuric acid phase containing reaction product equivalent to that formed and continuously returning the remainder of the sulfuric acid phase to said reaction zone.

14. A continuous process for producing an olefine derivative which comprises continuously feeding olefine containing hydrocarbon material in the liquid state and a liquid reagent reactive therewith to a reaction zone containing an excess of said reactive liquid reagent maintained at a temperature at which reaction takes place, continuously withdrawing reaction mixture from said reaction zone without substantially changing its composition, removing undissolved hydrocarbon from the reactive liquid reagent, removing a part of said reactive liquid reagent containing reaction product equivalent to that formed and continuously returning the remainder of said liquid reagent to said reaction zone.

15. A continuous process of absorbing an olefine in an acid-acting medium which comprises adding said olefine in the liquid phase and said acid-acting medium to an absorption product of said olefine in said medium, withdrawing the resulting mixture at a higher volumetric rate than that of said olefine and acid-acting medium additions, separating an amount of the resulting olefine absorption product equivalent to the acid-acting medium addition and returning the remainder of said absorption product to the absorption unit.

16. A continuous process of absorbing an olefine in a mineral acid-acting acid which comprises continuously feeding said olefine in the liquid phase and said acid to a mixer maintained substantially liquid-full and under strong agitation, continuously withdrawing the resulting mixture to a separator also maintained substantially liquid-full, separating unabsorbed hydrocarbons which may be present from the resulting olefine absorption product, separating an amount of absorption product substantially equivalent to the acid feed and returning the remaining absorption product to the mixer.

17. A continuous process of absorbing the tertiary-base olefine content of an olefinic mixture containing less reactive olefines which comprises continuously adding said mixture in the liquid state and an aqueous acid-acting medium to an absorption product of said tertiary-base olefine in said acid-acting medium at a temperature at which substantial absorption of the tertiary-base olefine takes place without substantial conversion of the less reactive olefines present, continuously withdrawing the resulting absorption mixture, separating unabsorbed material present, removing a part of the absorption product from the system and continuously returning the remainder to contact with fresh tertiary-base olefine containing olefinic mixture and aqueous acid-acting medium.

18. A continuous process of absorbing isobutylene containing hydrocarbon in the liquid phase with an aqueous sulfuric acid solution of about 40% to about 80% strength at a temperature at which substantial absorption of isobutylene is effected without substantial polymerization in the presence of a substantially larger volume of an absorption product of isobutylene in said acid, continuously withdrawing the resulting reaction mixture at a substantially higher rate than that at which the isobutylene and acid solution are fed, continuously separating unabsorbed hydrocarbons from the withdrawn mixture, removing a part of the resulting isobutylene absorption product equivalent to the feed and continuously returning the remainder to contact with fresh isobutylene and sulfuric acid solution at a rate at which the composition of the absorption product is maintained substantially constant.

RICHARD M. DEANESLY.